Figure 1:
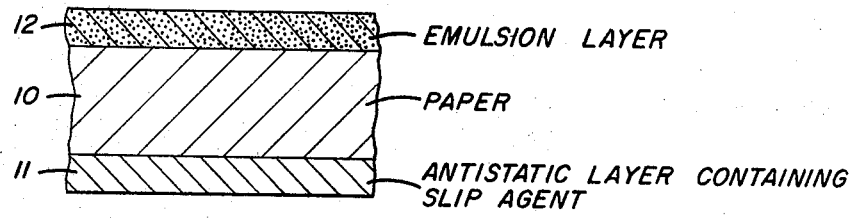
Figure 2:
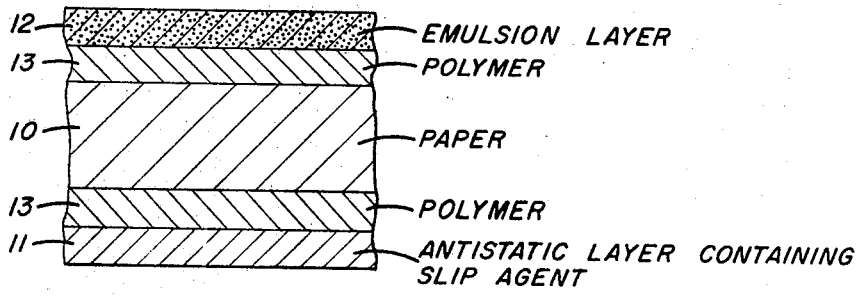

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 1, 1970

881 O.G. 23

T881,011

ANTISTATIC COMPOSITION WITH SLIP PROPERTIES

Douglas C. Joseph, Victor, and Harold K. Reed, Rochester, N.Y. (both of 1669 Lake Ave, Rochester, N.Y. 14650)

Filed June 10, 1070, Ser. No. 44,966
**Int. Cl. G03c *1/78***
U.S. Cl. 96—87
1 Sheet Drawing. 8 Pages Specification

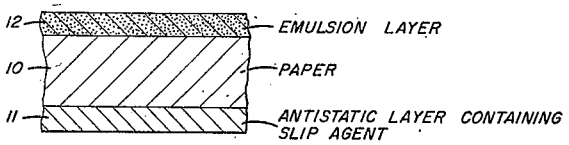

Photographic paper bases are provided with antistatic layers containing calcium stearate as a slip agent. A representative antistatic layer contains a mixture of colloidal silica, calcium stearate and sodium polymethacrylic acid. Calcium stearate reduces the coefficient of friction substantially more than other slip agents.

Dec. 1, 1970 D. C. JOSEPH ET AL T881,011

ANTISTATIC COMPOSITION WITH SLIP PROPERTIES

Filed June 10, 1970

DOUGLAS C. JOSEPH
HAROLD K. REED
INVENTORS

BY

ATTORNEY & AGENT